(12) United States Patent
Pham

(10) Patent No.: US 10,411,879 B2
(45) Date of Patent: Sep. 10, 2019

(54) METHODS, SYSTEMS, AND MEDIA FOR USING DYNAMIC PUBLIC KEY INFRASTRUCTURE TO SEND AND RECEIVE ENCRYPTED MESSAGES

(71) Applicants: Synergex Group, Greenwich, CT (US); Wayne Taylor, Chandler, AZ (US); Pham Holdings, Inc., Lacey, WA (US)

(72) Inventor: Thien Van Pham, Lacey, WA (US)

(73) Assignees: Synergex Group, Greenwich, CT (US); Pham Holdings, Inc., Lacey, WA (US); Wayne Taylor, Chandler, AZ (US)

( * ) Notice: Subject to any disclaimer, the term of this patent is extended or adjusted under 35 U.S.C. 154(b) by 134 days.

(21) Appl. No.: 15/469,119

(22) Filed: Mar. 24, 2017

(65) Prior Publication Data
US 2017/0279602 A1    Sep. 28, 2017

Related U.S. Application Data

(63) Continuation-in-part of application No. 15/081,447, filed on Mar. 25, 2016, now Pat. No. 10,135,618.

(51) Int. Cl.
*H04L 9/00* (2006.01)
*H04L 9/08* (2006.01)
(Continued)

(52) U.S. Cl.
CPC ............ *H04L 9/006* (2013.01); *H04L 9/0819* (2013.01); *H04L 9/0891* (2013.01); *H04L 9/14* (2013.01);
(Continued)

(58) Field of Classification Search
CPC ..... H04L 9/006; H04L 9/0819; H04L 9/0891; H04L 9/14; H04L 9/30; H04L 9/32
See application file for complete search history.

(56) References Cited

U.S. PATENT DOCUMENTS 7,415,571 B1   8/2008 Hanan
2003/0065941 A1   4/2003 Ballard et al.
(Continued)

FOREIGN PATENT DOCUMENTS

WO   WO 2002/021793   3/2002

OTHER PUBLICATIONS

Notice of Allowance dated Jul. 31, 2018 in U.S. Appl. No. 15/081,447.
(Continued)

*Primary Examiner* — Ali S Abyaneh
*Assistant Examiner* — Paul E Callahan
(74) *Attorney, Agent, or Firm* — Byrne Poh LLP

(57) ABSTRACT

Methods, systems, and media for transmitting encrypted messages are provided. In some arrangements, the method comprises: generating, using a hardware processor by a first application, a first public key and a first private key corresponding to a first application; transmitting the first public key to a second application; receiving, from the second application, a second public key; encrypting a first message using the second public key corresponding to the second application; generating, by the first application, a third public key and a second private key; transmitting the encrypted message and third public key to the second application; receiving, from the second application, a second message and a fourth public key corresponding to the second application; and decrypting the second message using the second private key.

21 Claims, 3 Drawing Sheets

(51) Int. Cl.
*H04L 9/14* (2006.01)
*H04L 9/30* (2006.01)
*H04L 9/32* (2006.01)
*H04L 29/06* (2006.01)

(52) U.S. Cl.
CPC .................. *H04L 9/30* (2013.01); *H04L 9/32* (2013.01); *H04L 63/0428* (2013.01); *H04L 63/0442* (2013.01); *H04L 63/06* (2013.01); *H04L 63/101* (2013.01)

(56) References Cited

U.S. PATENT DOCUMENTS

| | | |
|---|---|---|
| 2005/0257057 A1 | 11/2005 | Ivanov et al. |
| 2006/0200660 A1 | 9/2006 | Woods |
| 2007/0299915 A1 | 12/2007 | Shraim et al. |
| 2008/0028464 A1* | 1/2008 | Bringle .................. G06F 21/33 726/22 |
| 2008/0240440 A1* | 10/2008 | Rose ....................... H04L 63/08 380/277 |
| 2010/0174791 A1 | 7/2010 | Tian et al. |
| 2010/0195824 A1 | 8/2010 | Lin et al. |
| 2011/0205965 A1 | 8/2011 | Sprigg et al. |
| 2013/0103807 A1 | 4/2013 | Couto et al. |
| 2014/0219447 A1 | 8/2014 | Park et al. |
| 2016/0154982 A1 | 6/2016 | Velusamy et al. |
| 2017/0180118 A1 | 6/2017 | Bernheim et al. |
| 2017/0188231 A1 | 6/2017 | Nix |
| 2017/0279602 A1 | 9/2017 | Pham |
| 2017/0279608 A1 | 9/2017 | Pham |

OTHER PUBLICATIONS

International Search Report and Written Opinion dated Jun. 22, 2017 in International Patent Application No. PCT/US2017/024084.
Office Action dated Dec. 19, 2017 in U.S. Appl. No. 15/081,447.

* cited by examiner

METHODS, SYSTEMS, AND MEDIA FOR USING DYNAMIC PUBLIC KEY INFRASTRUCTURE TO SEND AND RECEIVE ENCRYPTED MESSAGES

CROSS-REFERENCE TO RELATED APPLICATIONS

This application is a continuation-in-part of U.S. patent application Ser. No. 15/081,447, filed Mar. 25, 2016, now U.S. Pat. No. 10,135,618, which is hereby incorporated by reference herein in its entirety.

TECHNICAL FIELD

The disclosed subject matter relates to methods, systems, and media for using dynamic public key infrastructure to send and receive encrypted messages.

BACKGROUND

Data communications between software applications are not as secure as they should be. Many software applications communicate by symmetric key encryption using a single key that is shared. Other software applications use asymmetric encryption using Public Key Infrastructure (PKI) by using public and private keys. However, these encryption techniques are not sufficient to protect a communication link between two software applications. For example, in asymmetric encryption, if the private key is compromised, the communication link is not secure and the person or software snooping on the communication link can read all the messages communicated.

SUMMARY

Methods, systems, and media for transmitting encrypted messages are provided. In accordance with some arrangements of the disclosed subject matter, methods for transmitting encrypted messages are provided, the methods comprising: generating, using a hardware processor by a first application, a first public key and a first private key corresponding to a first application; transmitting the first public key to a second application; receiving, from the second application, a second public key; encrypting a first message using the second public key corresponding to the second application; generating, by the first application, a third public key and a second private key; transmitting the encrypted message and third public key to the second application; receiving, from the second application, a second message and a fourth public key corresponding to the second application; and decrypting the second message using the second private key.

In accordance with some arrangements of the disclosed subject matter, systems for transmitting encrypted messages are provided, the systems comprising: a hardware processor that is programmed to: generate, by a first application, a first public key and a first private key corresponding to a first application; transmit the first public key to a second application; receive, from the second application, a second public key; encrypt a first message using the second public key corresponding to the second application; generate, by the first application, a third public key and a second private key; transmit the encrypted message and third public key to the second application; receive, from the second application, a second message and a fourth public key corresponding to the second application; and decrypt the second message using the second private key.

In accordance with some arrangements of the disclosed subject matter, computer-readable media containing computer executable instructions that, when executed by a processor, cause the processor to perform a method for transmitting encrypted messages are provided. The method comprises: generating, by a first application, a first public key and a first private key corresponding to a first application; transmitting the first public key to a second application; receiving, from the second application, a second public key; encrypting a first message using the second public key corresponding to the second application; generating, by the first application, a third public key and a second private key; transmitting the encrypted message and third public key to the second application; receiving, from the second application, a second message and a fourth public key corresponding to the second application; and decrypting the second message using the second private key.

A method is disclosed for transmitting encrypted messages. The method may comprise generating, using a hardware processor by a first application, a first public key and a first private key corresponding to a first application. The method may comprise transmitting the first public key to a second application. The method may comprise receiving, from the second application, a second public key. The method may comprise encrypting a first message using the second public key corresponding to the second application. The method may comprise generating, by the first application, a third public key and a second private key. The method may comprise transmitting the encrypted message and third public key to the second application. The method may comprise receiving, from the second application, a second message and a fourth public key corresponding to the second application. The method may comprise decrypting the second message using the second private key.

One or more of the steps of the method may be carried out by one or more processors. The one or more processors may be associated with one or more of the first and second applications.

The method may further comprise the step of determining whether a command included in at least one of the first and second messages is a valid command. In response to determining that the command is not a valid command, the method may further comprise transmitting a fraud alert to at least one user device. Transmitting the fraud alert to the at least one user device may comprise transmitting at least one of: a text message to the at least one user device and an email to a user account associated with the at least one user device. In response to determining that the command is not a valid command, the method may further comprise blocking, by the application in receipt of the invalid command, further messages from the application from which the command was received.

Determining whether the command is a valid command may comprise determining whether the command is known to the at least one application. The command may be stored in a memory associated with the at least one application and the step of determining whether the command is a valid command may comprise looking up the command in the memory. The command may be stored in the memory with an instruction and/or tag. The instruction and/or tag may indicate whether or not the command is a valid command.

At least one of the first, second and third key pairs may be different to at least one other of the first, second and third and key pairs. At least one of the public and private key pairs may be generated using an asymmetric encryption algorithm.

The first message may include an address associated with the second application. The address may be an Internet Protocol (IP) Address. The content of the message may include at least one of binary data and text data.

The second message may be an acknowledgement message from the second application.

A computer readable media is disclosed comprising instructions executable by a processor to perform at least at one of the steps of the method of transmitting encrypted messages.

A system is disclosed for transmitting encrypted messages. The system may comprise a hardware processor that is programmed to generate, by a first application, a first public key and a first private key corresponding to a first application. The hardware processor may be programmed to transmit the first public key to a second application. The hardware processor may be programmed to receive, from the second application, a second public key. The hardware processor may be programmed to encrypt a first message using the second public key corresponding to the second application. The hardware processor may is programmed to generate, by the first application, a third public key and a second private key. The hardware processor may be programmed to transmit the encrypted message and third public key to the second application. The hardware processor may be programmed to receive, from the second application, a second message and a fourth public key corresponding to the second application. The hardware processor may be programmed to and decrypt the second message using the second private key.

A computer-readable media is disclosed containing computer executable instructions that, when executed by a processor, cause the processor to perform a method for transmitting encrypted messages. The method may comprise generating, by a first application, a first public key and a first private key corresponding to a first application. The method may comprise transmitting the first public key to a second application. The method may comprise receiving, from the second application, a second public key. The method may comprise encrypting a first message using the second public key corresponding to the second application. The method may comprise generating, by the first application, a third public key and a second private key. The method may comprise transmitting the encrypted message and third public key to the second application. The method may comprise receiving, from the second application, a second message and a fourth public key corresponding to the second application. The method may comprise decrypting the second message using the second private key.

A method is disclosed of transmitting encrypted messages, comprising: generating, by a first application, a first public key and a first private key corresponding to the first application; transmitting, by the first application, the first public key to a second application; generating, by a second application, a second public key and a second private key corresponding to the second application; receiving, by the first application, the second public key from the second application; encrypting, by the first application, a first message using the second public key corresponding to the second application; generating, by the first application, a third public key and a third private key; and transmitting, by the first application, the encrypted message and the third public key to the second application.

The method may further comprise the step of generating, by the second application, a fourth public key and a fourth private key. The method may further comprise the step of receiving, by the first application, a second message and the fourth public key from the second application. The method may further comprise the step of decrypting, by the first application, the second message using the second private key.

A system is disclosed for transmitting encrypted messages, the system comprising: one or more hardware processors programmed to: generate, by a first application, a first public key and a first private key corresponding to a first application; transmit the first public key to a second application; generate, by the second application, a second public key and a second private key; receive, from the second application, a second public key; encrypt a first message using the second public key corresponding to the second application; generate, by the first application, a third public key and a third private key; transmit the encrypted message and the third public key to the second application.

A method is disclosed of transmitting encrypted messages from a first application, the method comprising: generating, by the first application, a first public key and a first private key corresponding to the first application; transmitting, by the first application, the first public key to a second application; receiving, by the first application, a second public key from the second application, wherein the second public key corresponds to the second application and a second private key; encrypting, by the first application, a first message using the second public key; generating, by the first application, a third public key and a third private key; and transmitting, by the first application, the first message and the third public key to the second application.

The method may further comprise the step of receiving, by the first application, a second message and a fourth public key from the second application, wherein the second message is encrypted using the third public key and wherein the fourth public key corresponds to the second application. The method may further comprise the step of decrypting, by the first application, the second message using the third private key.

A method is disclosed of receiving encrypted messages at a second application, the method comprising: receiving, by the second application, a first public key from the first application, wherein the first public corresponds to the first application and a first private key; generating, by the second application, a second public key and a second private key corresponding to the second application; transmitting, by the second application, the second public key to the first application; receiving, by the second application, a first message and a third public key from the first application, wherein the first message is encrypted using the second public key and wherein the third public key corresponds to the first application and a third private key.

The method may further comprise the step of decrypting, by the second application, the first message using the second private key. The method may further comprise the step of generating, by the second application, a fourth public key and a fourth private key. The method may further comprise the step of encrypting, by the second application, a second message using the third public key. The method may further comprise the step of transmitting, by the second application, the second message and the fourth public key to the first application.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figure 1:
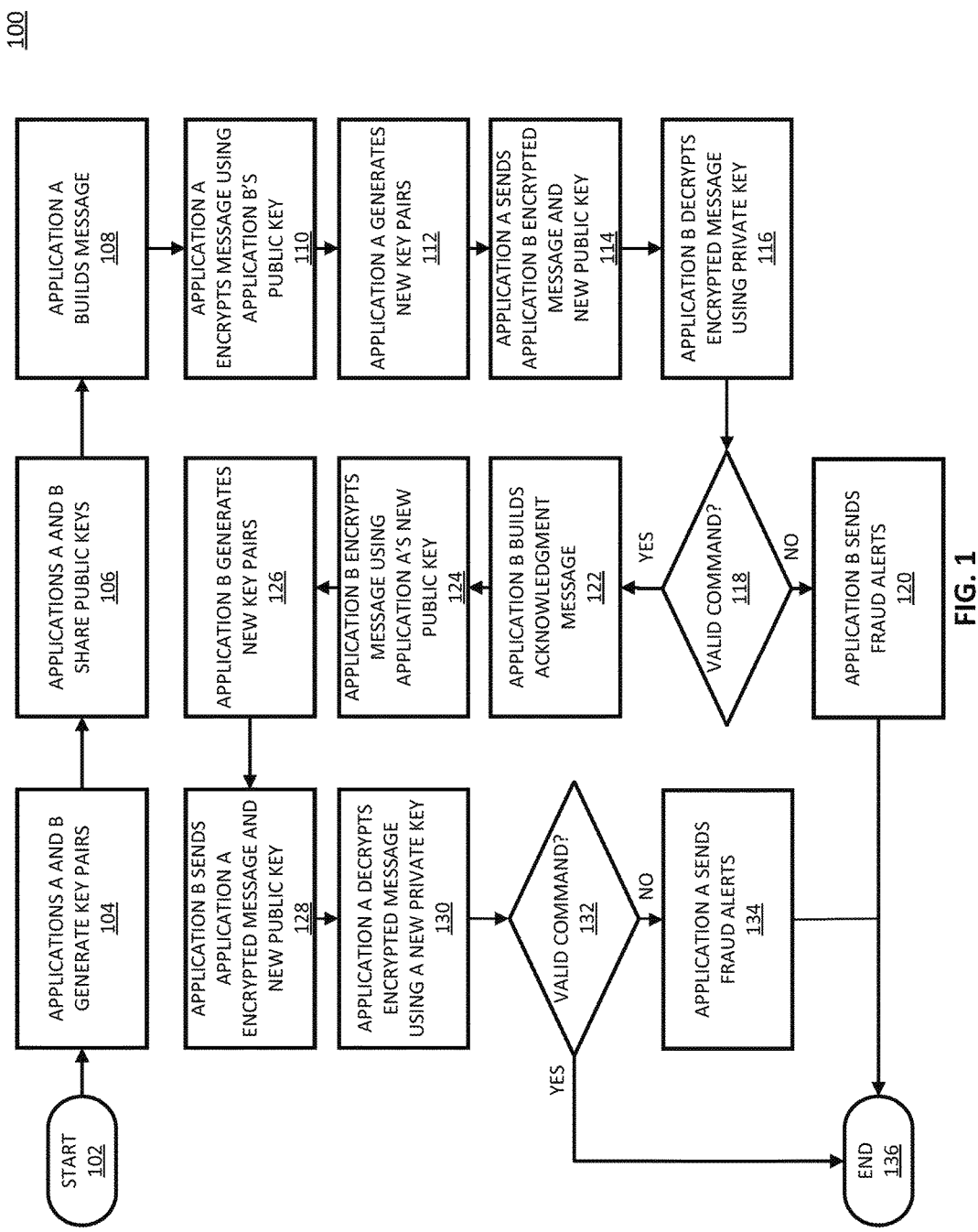
FIG. 1 shows an example of a process for using dynamic public key infrastructure to send and receive encrypted messages in accordance with some arrangements of the disclosed subject matter.

In accordance with various arrangements, mechanisms (which can include methods, systems, and media) for using dynamic public key infrastructure to send and receive encrypted messages are provided.

In particular, a method is provided that makes the exchange of public and private keys between software applications dynamic. In short, new public and private keys are generated by an application each time it transmits a message such that the application's keys change unpredictably with time. Usefully, this makes it very challenging and energy intensive for an unauthorized application to snoop on data communications because it must keep up with the dynamically changing public and private key pairs. As a result, security levels are increased.

In some arrangements, the mechanisms described herein can encrypt messages and transmit the messages between two applications (e.g., two applications executing on mobile devices, and/or any other suitable types of applications). In some arrangements, the mechanisms can validate transmitted messages, for example, by determining if a command included in a received message is valid. In some such arrangements, the mechanisms can transmit fraud alerts in response to determining that a received message is invalid. For example, in some arrangements, the fraud alerts can be transmitted to user devices and/or user accounts indicated by an application that determines that a received message is invalid. The fraud alerts can also be transmitted to other software applications warning them to be cautious of messages received from the same source. Advantageously, by determining that a received message is invalid, the application can protect itself and/or the hardware it is running on and thus ultimately the user of the application and/or hardware. For example, the application may avoid executing any instructions in the received message, such as requests for data, requests to share encryption keys and/or requests for access to a memory of the hardware on which the application is running. Alternatively or additionally, the application may also transmit an alert to security software, such as antivirus and/or anti hacking software.

In some arrangements, the mechanisms described herein can encrypt and decrypt messages using any suitable technique or combination of techniques. For example, in some arrangements, a first application and a second application can each generate public and private key pairs, and can exchange public keys. The first application can then generate a message and encrypt the message using the second applicant's public key. The first application can then generate a new public and private key pair, and can transmit the message to the second application with the new public key. The second application can decrypt the received message using the second application's private key. In some arrangements, the second application can generate an acknowledgement message and can encrypt the acknowledgement message using the first application's public key. In some arrangements, the mechanisms described herein can dynamically generate new public-private key pairs for every transmitted message. In some arrangements, encryption and/or decryption can be performed using an asymmetric encryption and/or decryption algorithm using the generated keys, as described below in connection with FIG. 1.

Figure 3:
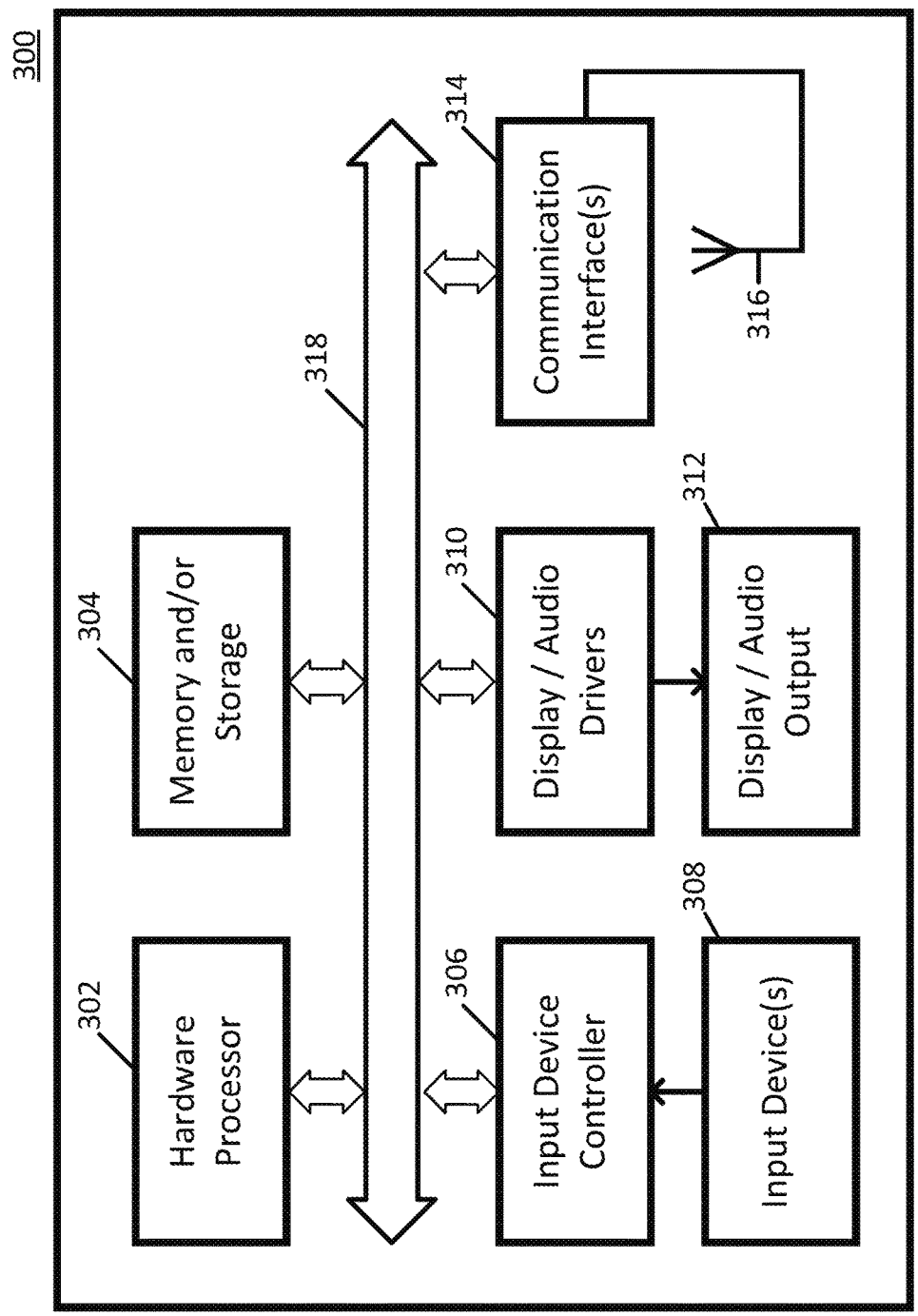
FIG. 3 shows an example of hardware that can be used in a server and/or a user device in accordance with some arrangements of the disclosed subject matter.

Turning to FIG. 1, an example 100 of a process for sending and receiving secured messages between software applications by first generating PKI public and private keys, sharing public keys, building a message, encrypting the message, generating new PKI public and private keys, sending the message and the new PKI public key, validating the message, sending fraud alerts, black listing IP Addresses, sending an acknowledgement message and validating an authenticity of the acknowledgement message is shown in accordance with some arrangements of the disclosed subject matter. As will be described in more detail below, the messages referred to in process 100 can be sent and received in accordance with the hardware shown in FIG. 200. As is also described in more detail below, the process 100 can be implemented using the hardware 300 of FIG. 3, or any other suitable hardware arrangement.

Process 100 can begin at 102. Process 100 can then continue to block 104, where Application A and Application B can generate Public Key Infrastructure (PKI) public and private key pairs. Application A and Application B can generate PKI public and private key pairs using any suitable PKI cryptosystem. Instructions for the PKI cryptosystem may be stored in a memory, such as memory 304, which is local to Application A and/or B and the instructions may be executable by a processor, such as processor 302, which is communicably coupled with the memory to generate the PKI public and private key pairs. By way of example, Application A and Application B can use the Rivest-Shamir-Adleman (RSA) cryptosystem. Note that, in some arrangements, Application A and Application B can be any suitable types of applications (e.g., applications executing on mobile devices, applications executing on non-mobile devices, and/or any other suitable types of applications). For example, Application A and B can be applications on a computer. Additionally, in some arrangements, Application A and Application B can be applications on the same device (e.g., the same user device) and/or on different devices.

At block 106, Application A and Application B can exchange public keys. For example, in some arrangements, Application A can transmit its PKI public key to Application B over a communication network, such as communication network 206. Alternatively, where Application A and B are applications on the same device, Application A can transmits its PKI public key to Application B internally within the device. As another example, in some arrangements, Application B can transmit its PKI public key to Application A. In some arrangements, at least one of the applications may make its public key publically known by, for example, publically broadcasting its public key over communications network 206. Note that, in some arrangements, a communication link can be established between Application A and Application B once public keys have been shared between Application A and Application B. In some such arrangements, messages can be transmitted between Application A and Application B via the communication link. Advantageously, because of the use of PKI, the communication link is a secure communication link between the two applications.

At block 108, Application A can generate a message to be transmitted to Application B. In some arrangements, the message can include any suitable information and can be in any suitable format. For example, in some arrangements, the message can include a delivery address of Application B, such as an Internet Protocol (IP) address of Application B; a command that is known to both Application A and Application B; content of a message transmitted to Application B; and/or any other suitable information. An example format of the message generated at block 108 can be: "[IP Address]:[Command]:[Message]," where "[Message]" can be the content of the message (e.g., a value or other text associated with the command, and/or any other suitable type of message content). In some arrangements, the content of the message can be text data, binary data, and/or data in any other suitable format. Note that the example given above is merely an example, and, in some arrangements, the generated message can have any suitable format, and the information within the message can be ordered in any suitable order. For example, in some arrangements, information within the message can be separated by semi-colons, periods, hyphens, and/or any other suitable delimiters. As discussed in more detail below, any communications network suitable for transmitting messages between devices may be used.

At block 110, Application A can use the public key generated by Application B at block 104 and received by Application A at block 106 to encrypt the message. For example, in some arrangements, the message can be encrypted using an asymmetric encryption algorithm.

At block 112, Application A can generate a new PKI public and private key pair in a manner similar or the same as that described in reference to block 104.

At block 114, Application A can transmit the message generated at block 108 and the new public key generated at block 112 to Application B. Advantageously this begins the process of Applications A and B dynamically changing their public and private keys with each message transmitted between them since the public key transmitted by Application A with the message at block 114 is already different to the public key generated by Application A at block 104.

At block 116, Application B can receive the message transmitted from Application A. Application B can then decrypt the encrypted message using Application B's private key. In some arrangements, the decryption can be performed using an asymmetric decryption algorithm.

At block 118, Application B can determine whether a command included in the decrypted message is a valid command. For example, in some arrangements, Application B can determine if the command represents a command known to Application B. For example, Application B can determine if the command represents a command stored in a memory of the device on which Application B is running. The command may be stored in the memory of a device on which Application B is running with an instruction and/or tag that such a command is valid, acceptable and/or trustworthy. Alternatively, the command may be stored alongside an instruction and/or tag that the command is an invalid, unacceptable and/or untrustworthy command which should not be executed by the application. In some arrangements, Application B can determine that the decrypted message is authentic and/or has not been compromised in response to determining that the command included in the message is a valid command. In some arrangements, the decrypted message comprises an indication of the device or application ID and/or the device address—such as the IP address—from which the message has been received and Application B determines whether the ID and/or address corresponds to a trusted device and/or address. To do this, Application B may look up the ID and/or address in a list of IDs and/or addresses corresponding to trusted applications and/or devices in a memory of the device on which Application B is running.

If, at block 118, Application B determines that the command is a valid command ("yes" at 118), Application B can generate an acknowledgement message at block 122. In some arrangements, the acknowledgement message can include any suitable information and can be in any suitable format. For example, in some arrangements, similarly to the message generated by Application A at block 108, the acknowledgement message can include an IP address of Application A, a command known to both Application A and Application B, and any suitable message content. For example, in some arrangements, the message content can indicate that the command in the message received at block 114 has been successfully executed. Similar to block 108, an example format for the acknowledgement message is: "[IP Address]:[Command]:[Message]," where "[Message]" can be the content of the message and can be text data, binary data, or any other suitable type of data. In some arrangements, information included in the message can be in any suitable order and can be separated by any suitable type of delimiter, as described above in connection with block 108. Note that, in some arrangements, an order and/or a format of the acknowledgement message generated by Application B can be the same as the order and/or the format of the message generated by Application A at block 108. Alternatively, in some arrangements, the order and/or the format of the acknowledgement message can be different from the order and/or the format of the message generated by Application A at block 108.

Application B can then proceed to block 124 and can encrypt the acknowledgement messaging using the new PKI public key generated by Application A at block 112 and received by Application B at block 114. In some arrangements, Application B can encrypt the acknowledgement message using an asymmetric encryption algorithm. Application B can generate a new public and private key pair at block 126. Application B can then transmit the encrypted message and the new public key to Application A at block 128. Advantageously, because Application B generates and transmits a new public key to Application A with the acknowledgement, the process of dynamically changing the public and private keys is continued to better maintain the security of the communication link between the two applications.

Returning to block 118, if Application B determines that the command received from Application A is invalid ("no" at 118), Application B can send one or more fraud alerts at block 120. For example, in some arrangements, Application B can transmit fraud alerts to mobile phones indicated by Application B (e.g., specified by a creator of Application B, stored in a list or database associated with Application B, and/or indicated by Application B in any other suitable manner) and/or to email addresses indicated by Application B (e.g., specified by a creator of Application B, stored in a list or database associated with Application B, and/or indicated by Application B in any other suitable manner). In this way, Application B can warn a user that there has been a breach of security. Application B can additionally or alternatively respond to determining that the command received from Application A is invalid in any number of the ways previously described. In instances where the fraud alerts are emails transmitted to email addresses indicated by Application B, the email addresses can correspond to user accounts for users of Application B. In some arrangements, the fraud alerts can be in any suitable format, such as text messages sent to mobile devices, push notifications presented on mobile devices, emails transmitted to identified email addresses, and/or in any other suitable format. Additionally, in some arrangements, Application B can prevent Application A from transmitting additional messages to Application B by blocking messages received from Application A. Advantageously, the process of validating the decrypted message before acting upon the command(s) contained within it therefore improves the security of the data communication link yet further still by providing an additional layer of security to the encryption. For example, if the command is deemed invalid, Application B can ignore it and not answer what is a potentially damaging request, such as a request for private and/or personal data.

Turning back to block 128 and continuing from blocks 122, 124 and 126, if the command is a valid command, Application A can receive an encrypted message transmitted by Application B. As discussed in reference to block 124, the message comprises the new public key which is generated by Application B at block 126. At block 130, Application A can decrypt the encrypted message using the new PKI private key generated by Application A at block 112. In some arrangements, Application A can decrypt the message using an asymmetric encryption algorithm. As previously discussed, in this way, the public and private keys of Application A and B continue to dynamically change making it challenging for an unauthorized application to keep up with the changing encryption algorithms being used.

Application A can proceed to block 132 and can determine if a command included in the decrypted message is a valid command. For example, similar to block 118 (described above), Application A can determine if the command represents a command known to Application A. In some arrangements, Application A can determine that the message is authentic and/or has not been compromised in response to determining that the command is a valid command.

If, at block 132, Application A determines that the command is not a valid command ("no" at 132), Application A can transmit one or more fraud alerts at block 134. Similar to block 120 (described above), Application A can transmit the one or more fraud alerts to any suitable user devices and/or email addresses associated with user accounts indicated by Application A (e.g., indicated by a creator of Application A, stored in a list or database associated with Application A, and/or indicated in any other suitable manner). In some arrangements, the fraud alerts can be in any suitable format, such as text messages, emails, push notifications, and/or in any other suitable format. Additionally, in some arrangements, Application A can prevent Application B from transmitting additional messages to Application A.

Process 100 can end at 136.

Advantageously, the disclosed methods provide a more secure communication link between software applications. This is achieved in part by dynamically changing the PKI encryption keys every time a message is sent from an application. As has been discussed, this makes it more challenging and energy intensive for a hacking or snooping application because such an application must keep up with the dynamically changing private keys to successfully decrypt messages incoming to an application. Furthermore, a more secure communication link is also achieved by validating a received message and, in the event that the message is invalid, alerting device(s), users(s), and antivirus, anti-hacking and/or other applications of potentially fraudulent activity.

In another arrangement, the process 100 ends at block 114 after Application A has sent the encrypted message to Application B with the new public key generated at block 112. Usefully, some of the advantages of the overall process 100 are still achieved, because Application A's keys have still dynamically changed from the keys generated at block 104, which are initially shared with Application B, to the keys generated at block 112, which are communicated to Application B so that Application B can encrypt the return message to Application A using the new public key.

In another arrangement, one or both of the validations carried out at blocks 118 and 132 (and therefore 120 and 134) are not carried out.

Figure 2:
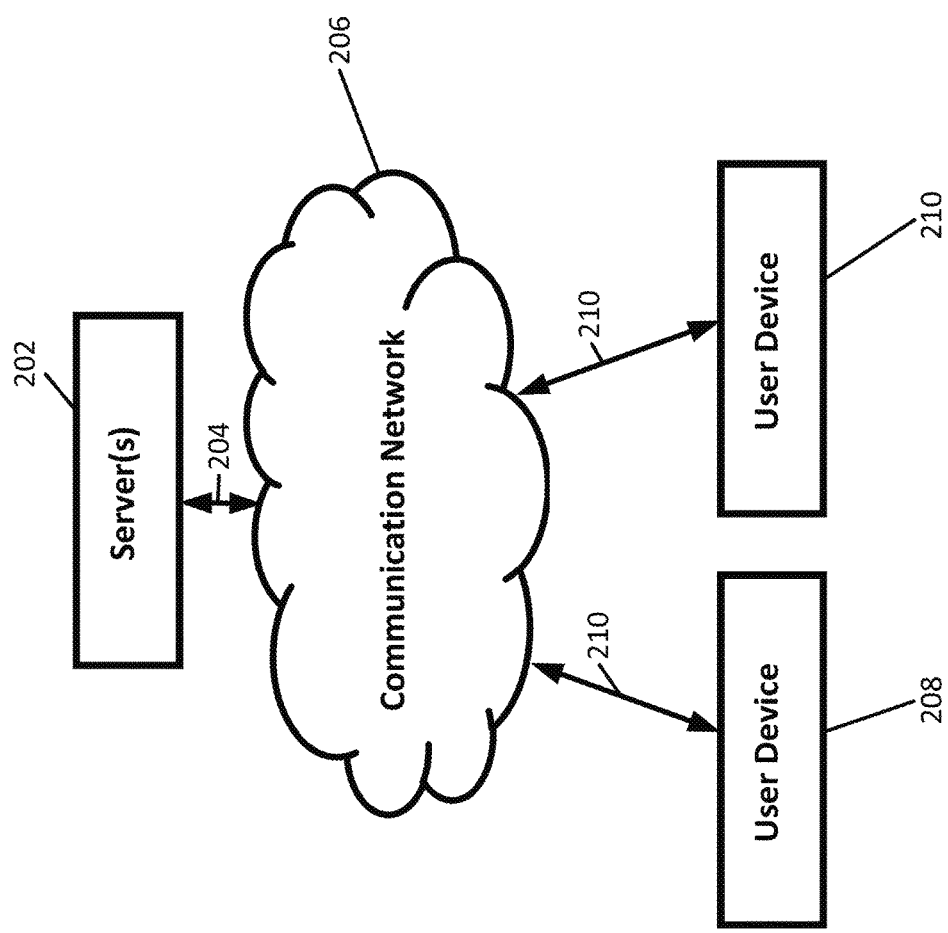
FIG. 2 shows a schematic diagram of an example of a system for using dynamic public key infrastructure to send and receive encrypted messages in accordance with some arrangements of the disclosed subject matter.

Turning to FIG. 2, an example 200 of hardware for using dynamic public key infrastructure to send and receive encrypted messages in accordance with some arrangements of the disclosed subject matter is shown. As illustrated, hardware 200 can include one or more servers 202, a communication network 206, and user devices 208 and/or 210.

Server(s) 202 can be any suitable servers for storing information and/or data associated with an application (e.g., an application that executes on a mobile device, an application that executes on a laptop computer or a desktop computer, and/or any other suitable application). For example, in some arrangements, server(s) 202 can be a server from which the application is downloaded by a user device, a server from which updates to the application are downloaded by the user device, a server that stores any suitable data (e.g., user data for users of an application, and/or any other suitable data), and/or performs any other suitable functions. In some arrangements, server(s) 202 can be omitted.

Communication network 206 can be any suitable combination of one or more wired and/or wireless networks in some arrangements. For example, communication network 110 can include any one or more of the Internet, a mobile data network, a satellite network, a local area network, a wide area network, a telephone network, a cable television network, a WiFi network, a WiMax network, and/or any other suitable communication network.

User devices 208 and/or 210 can be any suitable user devices for executing applications, transmitting information and/or data to a different application and/or a different user device, and/or performing any other suitable functions. In some arrangements, user devices 208 and/or 210 can include mobile devices (e.g., a mobile phone, a laptop computer, a wearable computer, and/or any other suitable mobile device) and/or non-mobile devices (e.g., a desktop computer, a smart television, and/or any other suitable non-mobile devices). In some arrangements, user devices 208 and/or 210 can be local to each other or remote from each other. User devices 208 and/or 210 can be connected by one or more communication links 210 to communication network 206 that can be linked via communication link 204 to server 202.

Although only one server 202 is shown in FIG. 1 to avoid over-complicating the figure, any suitable number of servers can be used in some arrangements.

Server(s) 202 and user devices 208 and 210 can be implemented using any suitable hardware in some arrangements. For example, in some arrangements, devices 202, 208, and 210 can be implemented using any suitable general purpose computer or special purpose computer. For example, a server may be implemented using a special purpose computer. Any such general purpose computer or special purpose computer can include any suitable hardware. For example, as illustrated in example hardware 300 of FIG. 3, such hardware can include hardware processor 302, memory and/or storage 304, an input device controller 306, an input device 308, display/audio drivers 310, display and audio output circuitry 312, communication interface(s) 314, an antenna 316, and a bus 318.

Hardware processor 302 can include any suitable hardware processor, such as a microprocessor, a micro-controller, digital signal processor(s), dedicated logic, and/or any other suitable circuitry for controlling the functioning of a general purpose computer or a special purpose computer in some arrangements.

Memory and/or storage 304 can be any suitable memory and/or storage for storing programs, data, media content, and/or any other suitable information in some arrangements. For example, memory and/or storage 304 can include random access memory, read-only memory, flash memory, hard disk storage, optical media, and/or any other suitable memory.

Input device controller 306 can be any suitable circuitry for controlling and receiving input from a device in some arrangements. For example, input device controller 306 can be circuitry for receiving input from a touch screen, from one or more buttons, from a voice recognition circuit, from a microphone, from a camera, from an optical sensor, from an accelerometer, from a temperature sensor, from a near field sensor, and/or any other type of input device.

Display/audio drivers 310 can be any suitable circuitry for controlling and driving output to one or more display/audio output circuitries 312 in some arrangements. For example, display/audio drivers 310 can be circuitry for driving an LCD display, a speaker, an LED, or any other type of output device.

Communication interface(s) 314 can be any suitable circuitry for interfacing with one or more communication networks, such as network 206 as shown in FIG. 2. For example, interface(s) 314 can include network interface card circuitry, wireless communication circuitry, and/or any other suitable type of communication network circuitry.

Antenna 316 can be any suitable one or more antennas for wirelessly communicating with a communication network in some arrangements. In some arrangements, antenna 316 can be omitted when not needed.

Bus 318 can be any suitable mechanism for communicating between two or more components 302, 304, 306, 310, and 314 in some arrangements.

Any other suitable components can be included in hardware 300 in accordance with some arrangements.

It should be understood that at least some of the above described blocks of the process of FIG. 1 can be executed or performed in any order or sequence not limited to the order and sequence shown in and described in the figure. Also, some of the above blocks of the process of FIG. 1 can be executed or performed substantially simultaneously where appropriate or in parallel to reduce latency and processing times. Additionally or alternatively, some of the above described blocks of the process of FIG. 1 can be omitted.

In an arrangement, instructions are stored in memory 304 and the instructions are executable by processor 302 to perform some or all of the steps of process 100.

In another arrangement, instructions for running Application A are stored in memory 304 on first hardware 300 and instructions for running Application B are stored in memory 304 on second hardware 300. In this arrangement, respective processors 302 of the first and second hardware 300 execute the instructions for running the applications. Furthermore, instructions may be stored in the respective memories 304 of the first and second hardware 300 which are executable by respective processors 302 of the first and second hardware 300 to perform relevant ones of the steps of process 100. The respective memories 304 and processors 302 of the first and second hardware 300 are communicably coupled via the bus 318. Furthermore, Applications A and B can communicate over communications network 206 via respective communications interface(s) 314 of the first and second hardware 300.

Data can be transmitted from Application A to Application B directly or indirectly. Similarly, data can be transmitted from Application B to Application A directly, or indirectly. In an arrangement, data is transmitted from at least one of the applications to the other of the applications via server 202. The data sent by the at least one application may comprise an address of the server 202. The server 202 may forward the data on to the other of the applications. In an arrangement, data is transmitted from at least one of the applications to the other of the applications via a component of the device associated with the application. For example, data may be transmitting from at least one of the applications to the other of the applications via communications hardware, such as antennae 316, which is associated with the device on which the at least one application is running. The data may be transmitted, for example via the antennae 316, over communication network 206.

The process disclosed herein may be implemented by a computer program product. The computer program product may include computer code arranged to instruct a computer to perform the functions of one or more of the various processes described above. The computer program product and/or the code for performing such methods may be provided to an apparatus, such as a computer, on computer readable media. In some implementations, any suitable computer readable media can be used for storing instructions for performing the functions and/or processes described herein. For example, in some implementations, computer readable media can be transitory or non-transitory. For example, non-transitory computer readable media can include media such as non-transitory forms of magnetic media (such as hard disks, floppy disks, etc.), non-transitory forms of optical media (such as compact discs, digital video discs, Blu-ray discs, etc.), non-transitory forms of semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

An apparatus, such as a computer, may be configured in accordance with such code to perform one or more processes in accordance with the various methods discussed herein.

Such an apparatus may take the form of a data processing system. Such a data processing system may be a distributed system. For example, such a data processing system may be distributed across a network.

In another arrangement, a computer readable medium comprising instructions executable by a processor to perform any one of the various methods disclosed herein is provided.

Accordingly, methods, systems, and media for using dynamic public key infrastructure to send and receive encrypted messages are provided.

Where it is possible without apparent technical incompatibility, features of different arrangements or aspects disclosed herein may be combined with some features optionally being omitted.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A method for transmitting encrypted messages, comprising:
generating, using a hardware processor by a first application, a first public key and a first private key corresponding to the first application;
transmitting the first public key to a second application;
receiving, from the second application, a second public key;
encrypting a first message using the second public key corresponding to the second application to form an encrypted message;
generating, by the first application, a third public key and a second private key in response to the encrypted message being about to be transmitted;
transmitting the encrypted message and the third public key to the second application;
receiving, from the second application, a second message and a fourth public key corresponding to the second application; and
decrypting the second message using the second private key.

2. The method of claim 1, wherein the first message includes an Internet Protocol (IP) Address associated with the second application.

3. The method of claim 1, further comprising:
determining whether a command included in the second message is a valid command; and
in response to determining that the command is not a valid command, transmitting a fraud alert to at least one user device.

4. The method of claim 3, wherein transmitting the fraud alert to the at least one user device comprises transmitting at least one of: a text message to the at least one user device and an email to a user account associated with the at least one user device.

5. The method of claim 3, wherein determining whether the command is a valid command comprises determining whether the command is known to the first application.

6. The method of claim 1, wherein content of the message comprises at least one of binary data and text data.

7. The method of claim 1, wherein the second message is an acknowledgement message from the second application.

8. A system for transmitting encrypted messages, the system
comprising:
a hardware processor that is programmed to:
generate, by a first application, a first public key and a first private key corresponding to the first application;
transmit the first public key to a second application;
receive, from the second application, a second public key;
encrypt a first message using the second public key corresponding to the second application to form an encrypted message;
generate, by the first application, a third public key and a second private key in response to the encrypted message being about to be transmitted;
transmit the encrypted message and the third public key to the second application;
receive, from the second application, a second message and a fourth public key corresponding to the second application; and
decrypt the second message using the second private key.

9. The system of claim 8, wherein the first message includes an Internet Protocol (IP) Address associated with the second application.

10. The system of claim 8, wherein the hardware processor is further
programmed to:
determine whether a command included in the second message is a valid command; and
in response to determining that the command is not a valid command, transmit a fraud alert to at least one user device.

11. The system of claim 10, wherein transmitting the fraud alert to the at least one user device comprises transmitting at least one of: a text message to the at least one user device and an email to a user account associated with the at least one user device.

12. The system of claim 10, wherein determining whether the command is a valid command comprises determining whether the command is known to the first application.

13. The system of claim 8, wherein content of the message comprises at least one of binary data and text data.

14. The system of claim 8, wherein the second message is an acknowledgement message from the second application.

15. A non-transitory computer-readable medium containing computer executable instructions that, when executed by a processor, cause the processor to perform a method for transmitting encrypted messages, the method comprising:
generating, by a first application, a first public key and a first private key corresponding to the first application;
transmitting the first public key to a second application;
receiving, from the second application, a second public key;
encrypting a first message using the second public key corresponding to the second application to form an encrypted message;
generating, by the first application, a third public key and a second private key in response to the encrypted message being about to be transmitted;
transmitting the encrypted message and the third public key to the second application;
receiving, from the second application, a second message and a fourth public key corresponding to the second application; and
decrypting the second message using the second private key.

16. The non-transitory computer-readable medium of claim 15, wherein the first message includes an Internet Protocol (IP) Address associated with the second application.

17. The non-transitory computer-readable medium of claim 15, wherein the method further comprises:

determining whether a command included in the second message is a valid command; and in response to determining that the command is not a valid command, transmitting a fraud alert to at least one user device.

18. The non-transitory computer-readable medium of claim 17, wherein transmitting the fraud alert to the at least one user device comprises transmitting at least one of: a text message to the at least one user device and an email to a user account associated with the at least one user device.

19. The non-transitory computer-readable medium of claim 17, wherein determining whether the command is a valid command comprises determining whether the command is known to the first application.

20. The non-transitory computer-readable medium of claim 15, wherein content of the message comprises at least one of binary data and text data.

21. The non-transitory computer-readable medium of claim 15, wherein the second message is an acknowledgement message from the second application.

* * * * *